(12) United States Patent
Georgopoulos et al.

(10) Patent No.: US 12,260,344 B2
(45) Date of Patent: Mar. 25, 2025

(54) DYNAMIC IN-MEMORY CONSTRUCTION OF A KNOWLEDGE GRAPH

(71) Applicant: International Business Machines Corporation, Armonk, NY (US)

(72) Inventors: Leonidas Georgopoulos, Zurich (CH); Peter Willem Jan Staar, Wädenswil (CH); Christoph Auer, Zurich (CH); Michele Dolfi, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 16/933,101

(22) Filed: Jul. 20, 2020

(65) Prior Publication Data
US 2022/0019907 A1    Jan. 20, 2022

(51) Int. Cl.
*G06N 5/022*  (2023.01)
*G06F 16/901*  (2019.01)
*G06F 40/10*  (2020.01)

(52) U.S. Cl.
CPC ......... *G06N 5/022* (2013.01); *G06F 16/9024* (2019.01); *G06F 40/10* (2020.01)

(58) Field of Classification Search
CPC ..... G06N 5/022; G06F 16/9024; G06F 40/10; G06F 16/36; G06F 40/30
See application file for complete search history.

(56) References Cited

U.S. PATENT DOCUMENTS

| 6,292,792 | B1 | 9/2001 | Baffes et al. | |
|---|---|---|---|---|
| 2018/0075359 | A1* | 3/2018 | Brennan | G06N 5/022 |
| 2018/0349511 | A1 | 12/2018 | Kleiman-Weiner et al. | |
| 2020/0057946 | A1* | 2/2020 | Singaraju | G06N 5/022 |

FOREIGN PATENT DOCUMENTS

| EP | 2728522 A1 * | 5/2014 | ............... G06N 5/04 |
|---|---|---|---|
| WO | WO-2014120202 A1 * | 8/2014 | ....... G06F 17/30327 |
| WO | 2018072563 A1 | 4/2018 | |

OTHER PUBLICATIONS

Ilievski et al., "KGTL: A Toolkit for Knowledge Graph Manipulation and Analysis," in arXiv preprint arXiv:2006.00088 (2020). (Year: 2020).*

(Continued)

*Primary Examiner* — Ryan C Vaughn
(74) *Attorney, Agent, or Firm* — Jordan T. Schiller (57) ABSTRACT

In an approach for a dynamic in-memory construction of a knowledge graph structure, the knowledge graph structure comprising a plurality of nodes and edges linking selected nodes to each other, a processor receives a record comprising a plurality of strings. The plurality of strings relates to a command combined with a set of strings. A processor determines content records relating to nodes relating to each of the strings. A processor assigns node identifiers for respective determined content records. A processor appends the node identifiers to a dynamic in-memory knowledge graph structure. A processor modifies an edge between selected ones of the node identifiers based on the command combined with the set of strings. A processor builds the dynamic in-memory knowledge graph structure.

20 Claims, 5 Drawing Sheets

(56) References Cited

OTHER PUBLICATIONS

Ilievski et al., "KGTK: A Toolkit for Knowledge Graph Manipulation and Analysis," in arXiv preprint arXiv:2006.00088 (2020). (Year: 2020).*

Estrella-Balderrama et al., "GraphSET, a Tool for Simultaneous Graph Drawing," in 40.10 Software: Prac. And Experience 849-63 (2010). (Year: 2010).*

Duan et al., "Specifying Architecture of Knowledge Graph with Data Graph, Information Graph, Knowledge Graph and Wisdom Graph", Proceedings of the 15th International Conference on Software Engineering Research, Management and Applications (SERA), Jun. 7-9, 2017, London, UK, 7 pages, <https://ieeexplore.ieee.org/abstract/document/7965747>.

Zhao et al., "Architecture of Knowledge Graph Construction Techniques", International Journal of Pure and Applied Mathematics, vol. 118 No. 19, 2018, pp. 1869-1883.

\* cited by examiner

DYNAMIC IN-MEMORY CONSTRUCTION OF A KNOWLEDGE GRAPH

BACKGROUND

The present disclosure relates generally to a generation of a knowledge graph, and more specifically, to a computer-implemented method for a dynamic in-memory construction of a knowledge graph structure. The present disclosure relates further to a corresponding construction engine for a dynamic in-memory construction of a knowledge graph structure, and a computer program product.

A knowledge graph may be a knowledge base to enhance a search engine's results with information gathered from a variety of sources. The information may be presented to users in an information box next to the search results. A knowledge graph can be viewed as a graph when considering its graph structure. When a knowledge graph involves formal semantics, a knowledge graph can be taken as a knowledge base for interpretation and inference over facts. A knowledge graph can be represented as a directed graph with nodes as entities and edges as relations.

SUMMARY

Aspects of an embodiment of the present disclosure disclose an approach for a dynamic in-memory construction of a knowledge graph structure. The knowledge graph structure includes a plurality of nodes and edges linking selected nodes to each other. A processor receives a record comprising a plurality of strings. The plurality of strings relates to a command combined with a set of strings. A processor determines content records relating to nodes relating to each of the strings. A processor assigns node identifiers for respective determined content records. A processor appends the node identifiers to a dynamic in-memory knowledge graph structure. A processor modifies an edge between selected ones of the node identifiers based on the command combined with the set of strings. A processor builds the dynamic in-memory knowledge graph structure.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention, are apparent from the examples of embodiments to be described hereinafter and are explained with reference to the examples of embodiments, but to which the invention is not limited.

Example embodiments of the invention will be described, by way of example only, and with reference to the following drawings.

DETAILED DESCRIPTION

In the context of this description, the following conventions, terms and/or expressions may be used:

The term 'knowledge graph structure'—or in a special form a knowledge sub-graph—may denote one or more data structures comprising a plurality of facts in nodes of the knowledge graph. The nodes may be connected via edges or links expressing a specific relationship between two nodes of the knowledge graph. In special cases, the edges can have weights expressing a strength of a relationship between two linked nodes. As an example, in a node and expression in the form of a word, couple of words, a sentence of the paragraph may be stored. Different representation formats may be used for the knowledge graph used for storing the knowledge graph relations between entities, e.g., nodes and its content, respectively. Formats include but are not limited to: (i) adjacency matrix format, (ii) adjacency list format, (iii) coordinate list (COO), (iv) compressed sparse row (CSR), (v) compressed sparse column (CSC) and (vi) list of lists (LIL).

The term 'nodes' may denote storage units adapted for storing facts in the sense of the above described knowledge graph.

The term 'edges' may denote connections or links between nodes in the sense of the above-described knowledge graph.

The term 'record' may denote a computer readable data structure comprising a plurality of strings. Each record may be terminated by an end of record called, namely, a determination code or termination character. Inside the record, strings may be separated by a separator character, like a space, a comma, a semicolon, etc.

The term 'string' may denote a concatenated sequence of characters. Different coding schemes may be used for the characters, e.g. the known ASCII code or the known EBCDICode. The coding shall not be limited to specific codes.

The term 'command'—or, alternatively an 'operation'—may denote an instruction how to deal with subsequent strings. Hence, the expression 'command combined with a set of strings' may relate to a sequence of strings, wherein, e.g., the first string is to be understood as a command or operation. Each of the various commands may relate to the creation, deletion or modification of and edge within the knowledge graph data structure.

The term 'group of strings' may denote a set of concatenated characters separated by separator characters.

The term 'content record' may denote a data structure—e.g., semi-structured—stored in a memory system, like a database system, a content management system, an object store, a file (or interconnected files) comprising a fact, i.e., an expression, a meaningful group of words, a sentence expressing a fact or a complete paragraph, an article, a white paper or—more generally—a document. The content records may be stored unrelated to each other in the memory system, e.g., a persistent memory system. A knowledge graph structure comprising representative numbers for selected facts as well as interrelation information between the facts, thereby turning the plurality of unrelated content records into a powerful knowledge graph system.

The term 'content storage' may denote the above-described memory system for content records.

The term 'node identifier' may denote, e.g., an integer value referring to a specific node in the knowledge graph structure. Hence, a link or edge may be referred to as a pair of node identifier integer values.

The term 'directly processor accessible memory system' may denote a memory system, like a main memory of a computer system, like a RAM (random access memory-StaticRAM or DynamicRAM). Also flash memory systems may be used as main and directly addressable memory sub-systems. They may be electrically connected to the processor via a bus system.

The term 'construction engine' may denote a below-described combination of units and modules interacting and collaborating with each other in order to execute the here-proposed functional concept of the dynamically creatable knowledge graph in main memory of a computer system— e.g., a server of a personal device of any kind.

Embodiments of the present disclosure recognize one of the biggest challenges in enterprise IT (information technology) is the management of knowledge and thus, unstructured data. In the cognitive computing age, often knowledge graphs are used to store, manage and process information outside of traditional transactional systems. Knowledge graphs are widely accepted instruments to organize a collaboration of people in organizations across departments and organizational boundaries. A knowledge graph comprises at least facts (typically collected from a plurality of sources) which are typically stored in nodes (aka vertices) of a mesh and edges (aka links between the nodes) storing relationships between the vertices, and thus, relationships between content items, i.e., facts, stored in the nodes of the knowledge graph. Different knowledge graphs may be used for different purposes within organizations and the information may be stored in different formats. On the other side, for an efficient extraction of information and an efficient processing of the retrieved information from the knowledge graph different representational formats may be helpful. It may also be a useful feature to use the same facts—i.e., basically the same nodes—in different contexts, and thus, as part of different knowledge graphs. However, this is a major, often unsurmountable hurdle in the management of knowledge graphs. Hence, typically, for such purposes of a dual usage of facts, knowledge graphs may be reorganized and stored twice which may, in turn, result in high-cost, time-consuming and complex maintenance tasks. Embodiments of the present disclosure recognize a dynamic management and fluid change of a knowledge graph and its internal dependencies remains a challenge. An objective of the proposed concept is to provide a flexible concept for dynamically adapting knowledge graphs.

The proposed computer-implemented method for performing an iteration of an output of a trained generator adversarial network may offer multiple advantages, contributions, and technical effects:

The proposed concept may allow a very dynamic and adaptable way to manage knowledge graphs. The fundamental difference to an existing knowledge graph concept may lie in the fact that traditional knowledge graphs are stored more or less inflexibly. This does not mean that they cannot be changed or adapted. However, typically, they are changed in a non-volatile memory in which facts in the forms of the nodes and links in the form of edges are permanently stored. Also the usage of long and often complex node identifiers may drag down the speed at which existing knowledge graphs may be built, extended, contracted or changed in the structure.

The here proposed concept may enable the knowledge graph building and construction in a much more dynamic way. For this, facts—i.e., nodes—or better content may be stored separate to the knowledge graph structure. The node information, e.g., as content records, may be stored separate to the structure of the knowledge graph. Additionally, information about a building of a knowledge graph may be kept separately to the underlying information base of the knowledge graph. Consequently, the each of the nodes available may be used to build a complete knowledge graph in such a way that each node may somehow be connected to another one. However, only a portion of the available content records may be used as nodes for a dynamically created and managed knowledge graph. This may be kept in the directly accessible memory by the processor.

If a new construction set of commands may reach the here proposed method, a completely different knowledge graph may be constructed on the same already existing information base. As a result, various knowledge graphs may be generated as needed, i.e., "on-demand"—i.e., "on-the-fly"—and formatted in a manner necessary for a specific application or problem to be solved. This may be done without reorganizing the underlying content but identifiers in form of integers linked to record identifiers pointing to content records on a content storage system may have to be changed, moved and adapted. This may be a much more efficient way to build a knowledge graph "on the fly".

An abstraction layer may translate the content records and the knowledge base to a sequence of integer values—or otherwise small information portions—which may be manageable in a fast and very efficient way in the main memory of a computing system. Hence, the knowledge graph may be created on demand from an instruction/command and operand buffer in different formats. This may allow a very fast access and navigation within the so created knowledge graph for a specific task at hand.

In case the application access requirements may change, a different knowledge graph may be generated dynamically without changing or moving the content records in the underlying information basis.

The data structure may be efficient, because the buffer may only take little space for storage, and in that processing a series of integers is relatively simple and fast. Additionally, such an approach may also be extendable, in that the content of the memory layout of the knowledge graph may be separated so that additional mechanisms may be added easily to particular implementations, e.g., to address the content without affecting the layout, to address the layout on a global basis, and to provide extensibility. In addition, such organization of a knowledge graph may lead to an off-line-online storage of the knowledge graph for fast loading.

This organization may therefore create a raw array of integers that, after operating in an append-only mode, does not represent anything like a comprehensible knowledge graph representation (such as adjacency lists or matrices) of the layout stored in main memory to ensure an efficient processing.

According to one or more embodiments of the method, one content record may relate to different received strings.

As an example: if the content record is a paragraph (e.g. one or two sentences of a longer text) a word A—i.e. string A—may relate to the content record as well as a word B—i.e., string B—because word A and word B are both part of the one or two sentences. Hence, the mathematical operation may be an n:1 mapping.

According to one or more embodiments of the method, the command may represent a creation of a link between two node identifiers, a deletion of a link between two node identifiers, and a modification of a link between two node identifiers in the dynamic in-memory knowledge graph structure. Thus, typical operations involving a relationship of nodes in a knowledge graph may be expressed by the command—i.e., the command string.

According to one or more embodiments of the method, the storage system may be a content storage independent of the dynamic in-memory knowledge graph structure. Hence, the storage system may be a persistent storage system of any kind or organization, e.g., a file system, a database (relational, hierarchical, or any other kind) an object store, a repository, a registry, and the like. As a consequence, one may say—in contrast to traditional knowledge graph constructions—that the content and the commands used for a definition of the knowledge graph—i.e., the dependencies between the content records—may be kept separate to each other.

According to one or more embodiments of the method, the dynamic in-memory knowledge graph structure may be stored in a directly processor accessible memory system. This may e.g., be a DRAM (dynamic Random Access Memory), SRAM (static RAM), but also cache memory of any kind. The storage cells used for a memory system may comprise typical technology for a direct accessible memory system, semiconductor, optical direct accessible storage media, and flash memory, just to name a few.

According to one or more embodiments of the method, a format of a string may be numeric or alphanumeric. However, also other code schemas may be used. Generally, it may be useful if the format of the strings and the content may be the same. Otherwise, a format transformation before a comparison or other content related function may be performed between the string and a content record.

According to one or more embodiments of the method, the plurality of strings comprises a termination string at its end. Hence, each received record may comprise a series of strings, each sequence being terminated by the termination string or termination character—in general a termination code. This may, e.g., be an EoL code (End of Line), a CR code (carriage return), a zero character, or a "−1" character. The only requirement may be that always the same termination string may be used for a consistent operation. This may allow consistent operation of the method.

According to one or more embodiments of the method, a position of the command may be predefined within a record or sub-record (each one terminated by a termination code). In one example, the position of the command—if present in a sequence of strings—may be the first position. This may allow an efficient method to differentiate between command strings and other strings. Additionally, the command string may have a predefined form by which it may be identifiable as command, e.g., (i) bit reservation (e.g., first bit reserved for a flag that the related byte is a command), or (ii) range reservation (ASCII range reserved, e.g., non-printable ASCII characters).

According to one or more embodiments, the method may comprise storing a plurality of records in a knowledge graph construction buffer. This may allow a batch-type of construction of the knowledge graph, allowing an efficient and fast execution of the records in the knowledge graph construction buffer. This mechanism may support a very efficient and dynamic construction of the knowledge graph structure, so to speak "on the fly". It also may allow a sequence of knowledge graph constructions under one aspect and a replacement knowledge graph construction using the same content records but a construction of the knowledge graph structure under a different aspect (e.g., with mostly the same nodes but different edges).

It may also allow to postpone a building (i.e., construction) of the knowledge graph structure until it may be required. It may also allow a transmission of the construction records—i.e., the knowledge graph construction buffer—to another computer system. For such a purpose, it may also be useful to store the content records "in a neutral place" (neutral to a plurality of processors, e.g., in a cloud computing center or in a centralized content management system of an enterprise).

According to one or more embodiments, the method may also comprise transferring the dynamic in-memory knowledge graph structure to a non-volatile memory. This way, the once constructed knowledge graph structure may be reloaded from a long-term storage in one step without the requirement to reconstruct the content record of nodes and edges in main memory. This may further enhance the performance of the system and method. It may also enable a freezing of a knowledge graph constructed "on the fly" for later reference and compliance reasons.

In the following, a detailed description of the figures will be given. All instructions in the figures are schematic. Firstly, a block diagram of an embodiment of the inventive computer-implemented method for a dynamic in-memory construction of a knowledge graph structure is given. Afterwards, further embodiments, as well as embodiments of the construction engine for a dynamic in-memory construction of a knowledge graph structure, will be described.

Figure 1:
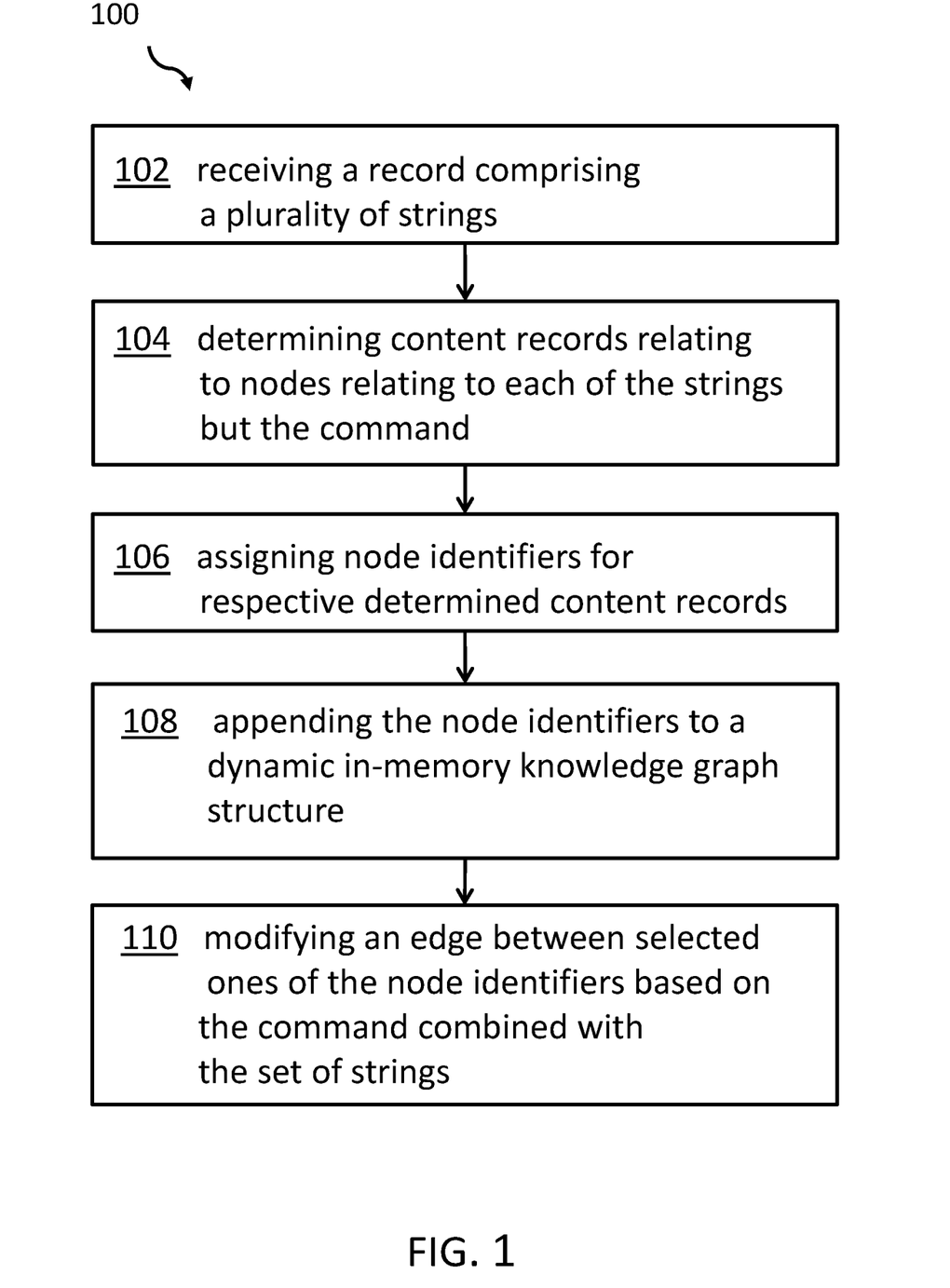
FIG. 1 shows a block diagram of an embodiment of the inventive computer-implemented method for a dynamic in-memory construction of a knowledge graph structure.

FIG. 1 shows a block diagram of an embodiment of the method 100 for a dynamic in-memory construction of a knowledge graph structure—or alternatively, a knowledge sub-graph or a complete knowledge graph. The knowledge graph structure comprises a plurality of nodes and edges linking selected nodes to each other. The method 100 comprises receiving, 102, a record—in general a plurality of records—comprising a plurality of strings. The string may relate to different objects, e.g., hash value or key pointing to the real content or a part of node content. Additionally, the string may represent a command, in particular for manipulating edges. In such case, at least two strings may follow the command, e.g., two knowledge graph nodes to which connection, i.e., edge, the command is related.

Hence, the plurality of strings relate to one selected out of the group comprising a command combined with a set of strings and a group of strings. If no command may be present, the node relating to the string may be appended to the already existing knowledge graph. Related edges may be added later.

The method 100 comprises also determining, 104, in a storage system, content records relating to nodes relating to each of the strings-however, this does not apply to a command on the sequence of strings.

Furthermore, the method 100 comprises assigning, 106, node identifiers relating to respective determined content records. The node identifiers may be a simple integer value, since they are fast to process. The node identifiers may be seen as method-internal node identifiers.

Moreover, the method 100 comprises appending, 108, the node identifier to a dynamic in-memory knowledge graph structure, and modifying, 110, an edge between selected ones of the node identifiers based on the command combined with the set of strings. Thereby, the dynamic in-memory knowledge graph structure is built.

This may happen if the execution of the related knowledge graph construction buffer is executed. The commands may comprise "create", "delete" and/or "modify", in particular an edge between nodes.

This way, different strings can be related to the same node, i.e., the same node identifier in an n:1 fashion. Identifying the nodes is dynamic, based on different "input values", i.e. strings. The knowledge graph does not need to be changed once the node identification procedure is changed. Multiple different representations for the knowledge graph are possible at the same time—also duplicates in different formats—i.e., the formats are irrelevant. Different ones may be used for different types of queries. Hence, a fully dynamic representation of the knowledge graph structure may be possible without ever moving content items, i.e., the values of the content records, i.e., the nodes.

Figure 2:
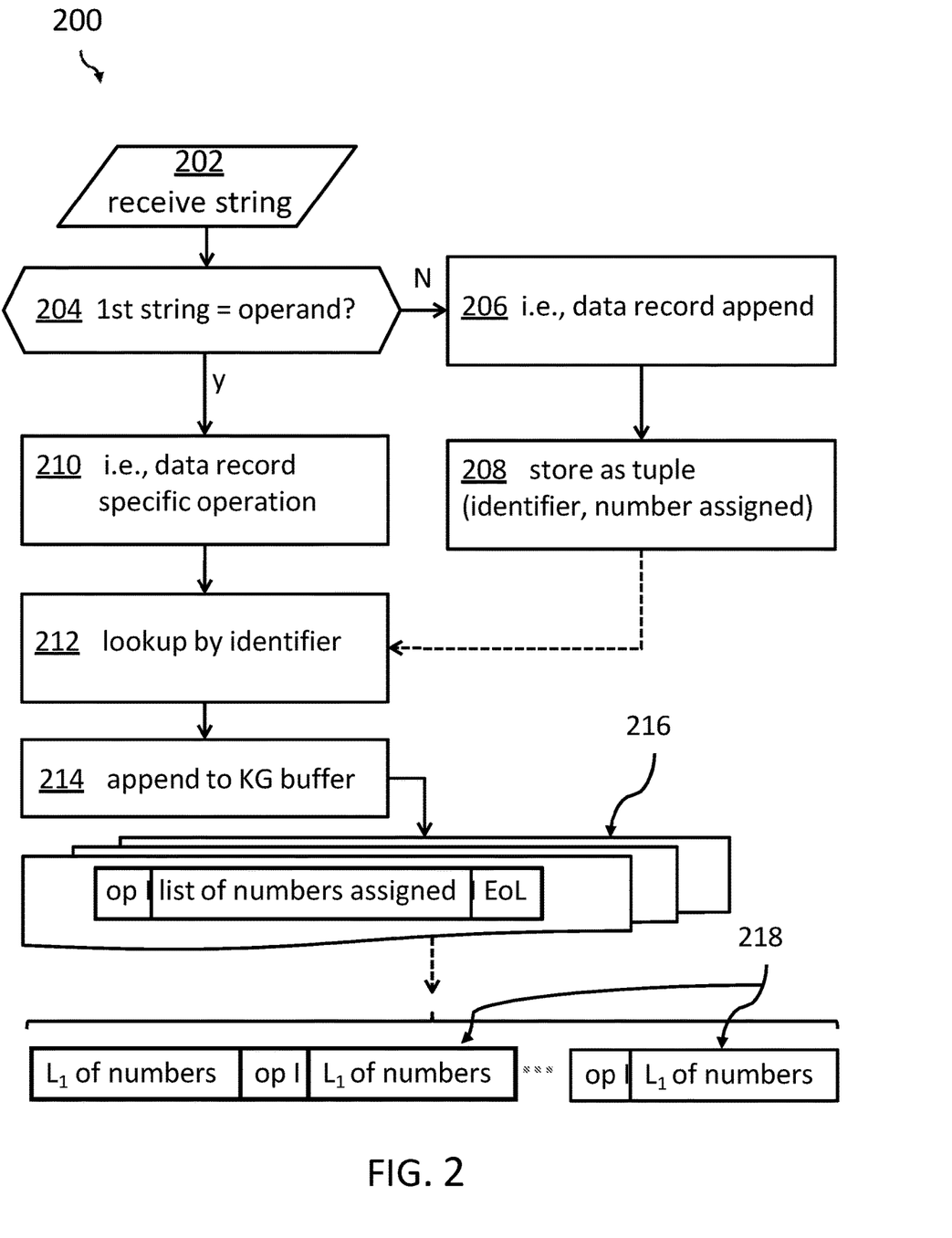
FIG. 2 shows a block diagram of a more implementation-near embodiment of the inventive concept.

FIG. 2 shows a block diagram 200 of an embodiment of the inventive concept. At the beginning of the process, in step 202, the program receives a string. This string is typically an element of the plurality of strings. In determination 204, the program determines whether the first string of the plurality of strings is a command (aka operation). If the program determines that the first string of the plurality of strings is not a command—(case "N"), the string has to relate to a data record which needs an appending to the knowledge graph, 206. In step 208—depending on the representation—a tuple (identifier, a process internal assigned number) is stored.

In case of a positive outcome of the determination 204 (case "Y"), the program determines that the string relates to a data or record specific operation (i.e. a command, abbreviated as "op") in step 210. These may be hindered record by record. In step 212, the program looks up an operation by identifier and performs both of the procedure sub-branches.

In step 214, the program appends the result to a knowledge graph construction buffer, basically in the form of <command; string1, string2, . . . ; termination code, e.g. "EoL"> (compare with step 216). As discussed above, the command may be omitted. Hence, a data structure 218 in the form of concatenated list of numbers—optionally with commands/operations—may form the knowledge graph structure buffer. In the data structure 218, the termination codes are not shown.

Figure 3:
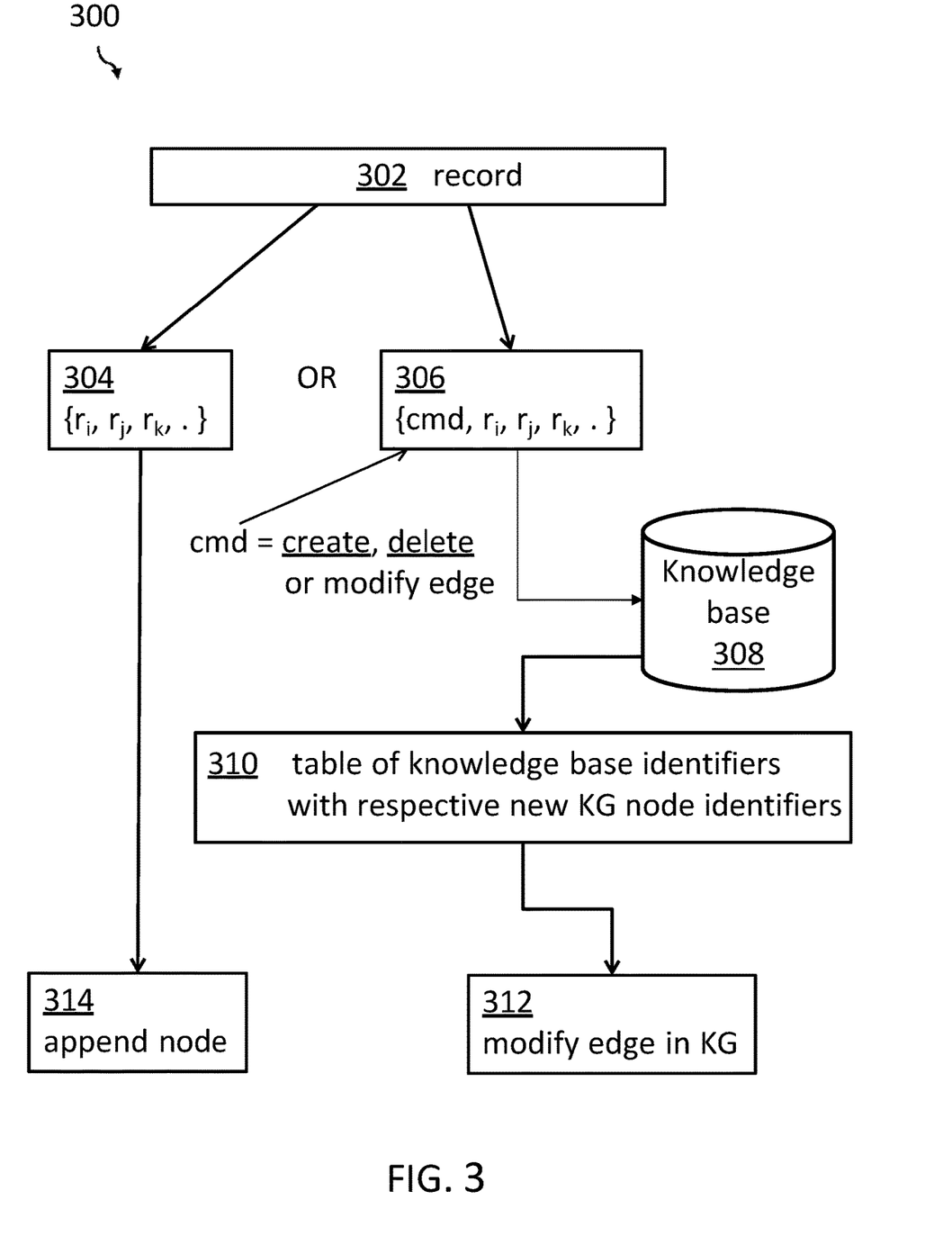
FIG. 3 shows a block diagram of another more implementation-near embodiment of the inventive concept.

FIG. 3 shows a block diagram 300 of another embodiment of the inventive concept. The program may receive record 302. Record 302 may comprise strings either in the form of operands $r_i$, $r_j$, $r_k$, . . . only or, in the form of a command in addition (e.g., followed by) as series of operands, again in the form of individual strings. All strings may be separated by commas, semicolons, spaces, or any other separation code.

As shown, the command may relate to the creation, a deletion or a modification of an edge. The related nodes between the edges are indicated by the operands $r_i$, $r_j$, $r_k$, . . .

The operands $r_i$, $r_j$, $r_k$, . . . are compared to content records in a database 308. Such a query may deliver back an identifier of the content record in the knowledge base 308 (e.g., a database of any sort). Based on this, a table 310 of knowledge base identifiers (referring to specific content records and the knowledge base) together with a new knowledge graph node identifier is generated. Together with the command (as indicated by reference numeral 306) an edge of the knowledge graph is modified, 312. The modification may be a creation of an edge between two nodes, a deletion of an edge or, a modification (e.g., a weighing factor or an edge type).

In case no command is present in the record 302—case 304—a node is simply appended to the knowledge graph structure, 314. However also in this case, reference may be made as to the knowledge base 308 and the additional node may be represented in the knowledge graph structure as a knowledge graph node identifier, e.g., in the form of an integer (for fast processing).

In other words, and without a direct reference to the previously described figures, the general concept may exemplary be described in the following way:

"Start": The underlying program obtains a set of character strings from an input port, e.g. {"c85abc1", "aaa1283"} or {"b85abc1", "aaa1287", "aac1290"}. The strings identify records in a database (i.e., the knowledge base in the form of a more or less flat database) or a file or other means of storage or user input. The sets identify a relation between the records of some sort. The first string can either be considered as an operation or a record.

If one of the strings is not equal to a predefined operation identifier—i.e., a command—then it is considered as a data entry (relating to a new node). Operations are to be applied on the identifiers in a set. For example, if "D1" is a predefined identifier for a "delete record" action, then {"D1", "aaa1287", "b85abc1"}, will perform a delete operation onto "aaa1287" as the delete operation would have been defined. If no operation is present in the sequence, then an addition or append is implied. It may be noted that the "delete record" action may not delete the underlying content record but only the process internal integer identifier.

Next, the underlying program processes each data identifier by assigning a determined numerical representation type (an integer in the simplest case) and storing the pair {identifier, number}; if the identifier is already stored, then the original number suffices.

Thirdly, the program then creates a mapped set from the input set by replacing data identifiers with the mapped integers resulting in sets of integers, and a special integer is appended to mark the end of sequence, e.g. "0" (or any other termination code). For example {"b85abc1", "aaa1287", "aac1290"} could be mapped to {10, 15, 16, 0}, and {"D1", "aaa1287", "b85abc1"} to {1, 15, 10, 0}. A reserved range of integers serves for holding the operations/commands.

Next, the generated sequence is appended in a knowledge graph creation buffer (compare 218, FIG. 2). For example, having received {"b85abc1", "aaa1287", "aac1290"} and then {"AD", "aaa1287"}, would generate a buffer [10, 15, 16, 0, "1", 15, 0]. This may assume that "AD" is an "add operation" or "add command".

The process continuous from "start" (see above) until there is no more input or there is a predefined limit reached, such as maximum buffer length, or some predefined time out.

The knowledge graph construction buffer is consumed by processing each element in sequence and performing the operations one by one. This step is detailed below. Once the buffer is consumed, the program may continue from "start" (see above) to process additional input records.

In the next paragraphs, a more detailed description is given for process steps happening during the aforementioned paragraph.

The following operations are well defined but the protocol is not too limited and there can be further user operations defined. The basic operations are an addition of relation between records and deletion of relation between records. The internal memory organization is a sequence of two arrays describing the relation. There may be a number of possible formats, e.g., the coordinate format.

The details of this process step are as follows:
(a) If the buffer is not empty, the next element is read.
(b) The read element is checked for either being an operation or an entry.
(c) If the element is an entry, then the full buffer is read up to 0 and proceed to (d). Otherwise, the operation subroutine is called by skipping the first element and reading up to 0 (the determination code) and proceeding to (e).
(d) All possible combinations are generated and appended to the memory (i.e., the knowledge graph) structure layout. For example {10,15,16,0} will generate for a coordinate layout format pairs [10,15], [10,16], [15,16], [15,10], [16, 10], [16,15]. Then the process is continued at (a).
(e) All possible combinations are generated and searched for in the memory layout, where the associated operation subroutine is applied. For example, a deletion {"D1", "aaa1287", "b85abc1"} to {1, 15, 10, 0}, would generate pairs [15,10], [10,15], and those pairs would be removed.

In another embodiment of the inventive concept, it might be possible to marshal the operations by grouping them together. For example, having multiple deletion operations may not be efficient but to permit as a last step, thus, grouping them together to be performed at once.

Figure 4:
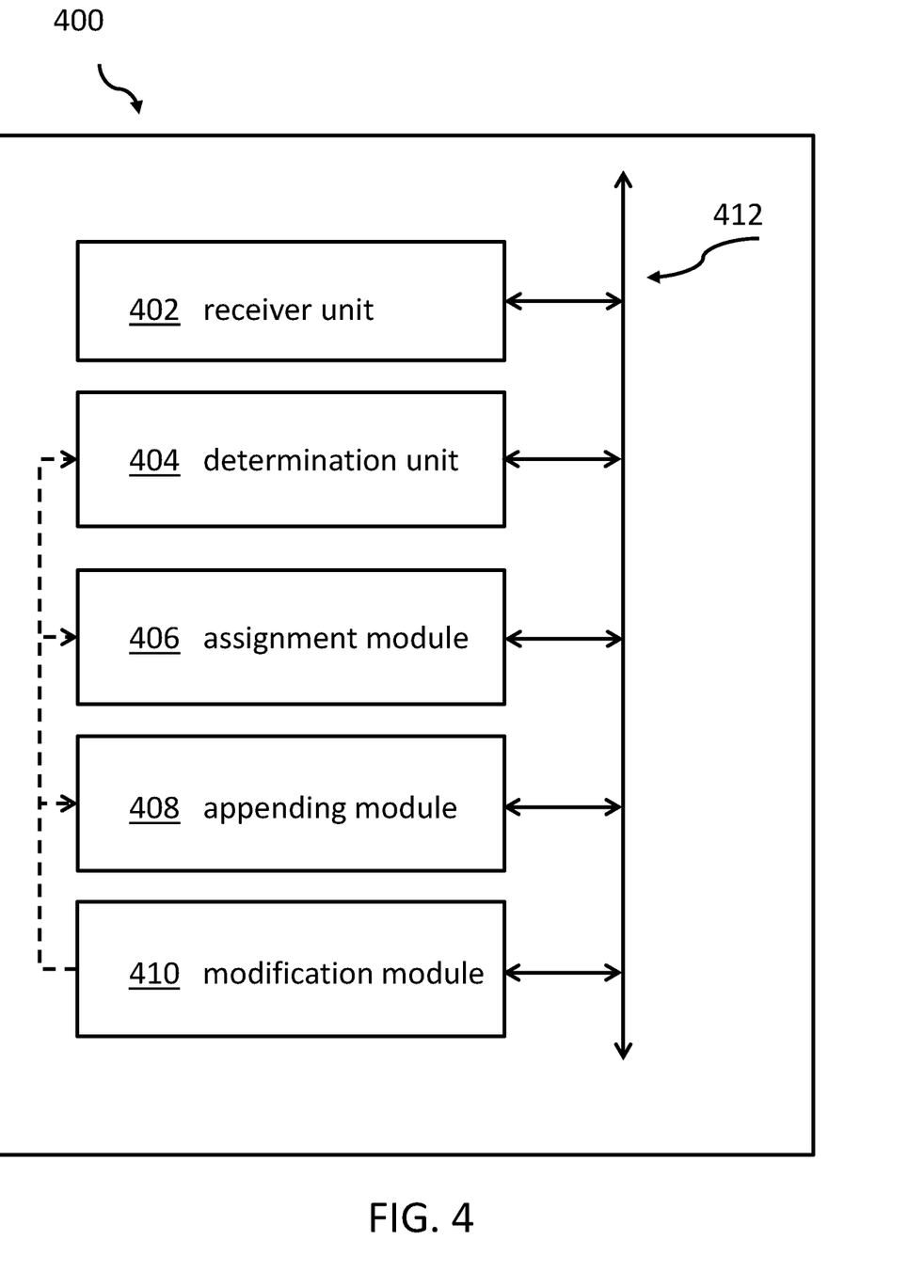
FIG. 4 shows an embodiment of an inventive construction engine for a dynamic in-memory construction of a knowledge graph structure.

For completeness reasons, FIG. 4 shows an embodiment of inventive construction engine 400 for a dynamic in-memory construction of a knowledge graph structure. The knowledge graph structure comprises a plurality of nodes and edges linking selected nodes to each other.

The construction engine 400 comprises receiving means—in particular a receiver module 402—adapted for receiving a record comprising a plurality of strings. Thereby, the plurality of strings relates to one selected out of the group comprising a command combined with a set of strings and a group of strings.

The engine 400 also comprises determining means—in particular determination unit 404—adapted for determining, in a storage system, content records relating to nodes relating to each of the strings but the command, assignment means—in particular an assignment module 406—adapted for assigning node identifiers for respective determined content records, appending means—in particular, an appending module 408—adapted for appending the node identifiers to a dynamic in-memory knowledge graph structure, and modification means—in particular, an modification module 410—adapted for modifying an edge between selected ones of the node identifiers based on the command combined with the set of strings.

A coordinated work of these modules may be instrumental for building the dynamic in-memory knowledge graph structure. Hence, the receiver module 402, the determination unit 404, the assignment module 406, the appending module 408, and the modification module 410 may be electrically connected for signal exchanges. Alternatively, the modules and/or units may be connected by a construction engine internal system bus 412.

Figure 5:
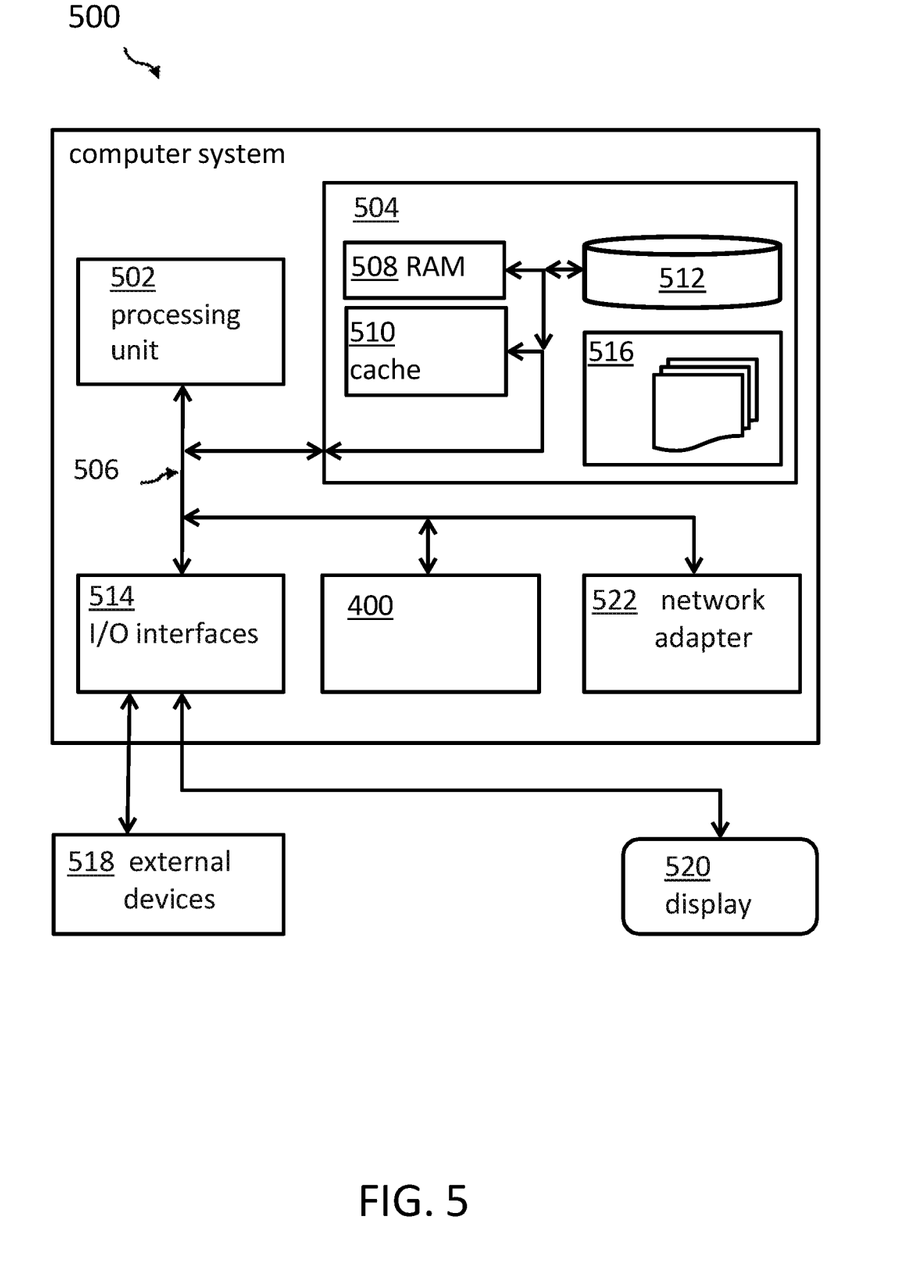
FIG. 5 shows an embodiment of a computing system comprising the construction engine according to FIG. 4.

Embodiments of the invention may be implemented together with virtually any type of computer, regardless of the platform being suitable for storing and/or executing program code. FIG. 5 shows, as an example, a computing system 500 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media accessible by computer system/server 500, and includes both volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic medium (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the construction engine 400 for a dynamic in-memory construction of a knowledge graph structure may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-ray disc.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for a dynamic in-memory construction of a knowledge graph structure, the knowledge graph structure comprising a plurality of nodes and edges linking selected nodes to each other, the method comprising:
    receiving a record comprising a plurality of strings, wherein the plurality of strings relates to a command combined with a set of strings;
    determining, in a storage system, content records relating to nodes relating to each of the strings, wherein an abstraction layer translates the content records and a knowledge base to a sequence of integer values;
    assigning node identifiers for respective determined content records;
    appending the node identifiers to a dynamic in-memory knowledge graph structure;
    modifying an edge between selected ones of the node identifiers based on the command combined with the set of strings, wherein the command comprises "create" or "delete" the edge between the plurality of nodes;
    building, simultaneously, multiple different representations of the dynamic in-memory knowledge graph structure on-the-fly, wherein the content records are stored separate to the knowledge graph structure and wherein the node identifiers pointing to the content records are changed, moved, and adapted to construct a different knowledge graph using a same knowledge base; and
    formatting the dynamic in-memory knowledge graph structure in a manner necessary for a specific application or problem to be solved.

2. The method of claim 1, wherein a same content record relates to different received strings.

3. The method of claim 1, wherein the command is selected from the group consisting of creation of a link between two node identifiers, deletion of a link between two node identifiers, and modification of a link between two node identifiers in the dynamic in-memory knowledge graph structure.

4. The method of claim 1, wherein the storage system is a content storage independent of the dynamic in-memory knowledge graph structure.

5. The method of claim 1, wherein the dynamic in-memory knowledge graph structure is stored in a processor able to directly access a memory system.

6. The method of claim 1, wherein a format of each of the strings is selected from the group consisting of numeric and alphanumeric.

7. The method of claim 1, wherein the plurality of strings comprises a termination string at the end of the plurality of strings.

8. The method of claim 1, wherein a position of the command is predefined.

9. The method of claim 1, further comprising storing a plurality of records in a knowledge graph construction buffer.

10. The method of claim 1, further comprising transferring the dynamic in-memory knowledge graph structure to a non-volatile memory.

11. A computer program product for a dynamic in-memory construction of a knowledge graph structure, the knowledge graph structure comprising a plurality of nodes and edges linking selected nodes to each other, the computer program product comprising:
one or more computer readable storage media, and program instructions collectively stored on the one or more computer readable storage media, the program instructions comprising:
program instructions to receive a record comprising a plurality of strings, wherein the plurality of strings relates to a command combined with a set of strings;
program instructions to determine, in a storage system, content records relating to nodes relating to each of the strings, wherein an abstraction layer translates the content records and a knowledge base to a sequence of integer values;
program instructions to assign node identifiers for respective determined content records;
program instructions to append the node identifiers to a dynamic in-memory knowledge graph structure;
program instructions to modify an edge between selected ones of the node identifiers based on the command combined with the set of strings, wherein the command comprises "create" or "delete", or "modify" the edge between the plurality of nodes;
program instructions to build, simultaneously, multiple different representations of the dynamic in-memory knowledge graph structure on-the-fly, wherein the content records are stored separate to the knowledge graph structure and wherein the node identifiers pointing to the content records are changed, moved, and adapted to construct a different knowledge graph using a same knowledge base; and
program instructions to format the dynamic in-memory knowledge graph structure in a manner necessary for a specific application or problem to be solved.

12. The computer program product of claim 11, wherein a same content record relates to different received strings.

13. The computer program product of claim 11, wherein the command is selected from the group consisting of creation of a link between two node identifiers, deletion of a link between two node identifiers, and modification of a link between two node identifiers in the dynamic in-memory knowledge graph structure.

14. The computer program product of claim 11, wherein the storage system is a content storage independent of the dynamic in-memory knowledge graph structure.

15. The computer program product of claim 11, further comprising:
program instructions, stored on the one or more computer-readable storage media, to store the dynamic in-memory knowledge graph structure.

16. The computer program product of claim 11, wherein a format of each of the strings is selected from the group consisting of numeric and alphanumeric.

17. The computer program product of claim 11, wherein the plurality of strings comprises a termination string at the end of the plurality of strings.

18. The computer program product of claim 11, wherein a position of the command is predefined.

19. The computer program product of claim 11, further comprising:
program instructions, stored on the one or more computer-readable storage media, to store a plurality of records.

20. A computer system for a dynamic in-memory construction of a knowledge graph structure, the knowledge graph structure comprising a plurality of nodes and edges linking selected nodes to each other, the computer system comprising:
one or more computer processors, one or more computer readable storage media, and program instructions stored on the one or more computer readable storage media for execution by at least one of the one or more computer processors, the program instructions comprising:
program instructions to receive a record comprising a plurality of strings, wherein the plurality of strings relates to a command combined with a set of strings;
program instructions to determine, in a storage system, content records relating to nodes relating to each of the strings, wherein an abstraction layer translates the content records and a knowledge base to a sequence of integer values;
program instructions to assign node identifiers for respective determined content records;
program instructions to append the node identifiers to a dynamic in-memory knowledge graph structure;
program instructions to modify an edge between selected ones of the node identifiers based on the command combined with the set of strings, wherein the command comprises "create" or "delete" the edge between the plurality of nodes;
program instructions to build, simultaneously, multiple different representations of the dynamic in-memory knowledge graph structure on-the-fly, wherein the content records are stored separate to the knowledge graph structure and wherein the node identifiers pointing to the content records are changed, moved, and adapted to construct a different knowledge graph using a same knowledge base; and
program instructions to format the dynamic in-memory knowledge graph structure in a manner necessary for a specific application or problem to be solved.

* * * * *